United States Patent [19]

Ramey et al.

[11] Patent Number: 4,895,901

[45] Date of Patent: Jan. 23, 1990

[54] POLYMETIC HINDERED AMINE LIGHT STABILIZERS

[75] Inventors: Chester E. Ramey, Chagrina Falls; Ronald E. Thompson, Parma; Charles J. Rostek, Jr., Chagrin Falls, all of Ohio

[73] Assignee: Ferro Corporation, Cleveland, Ohio

[21] Appl. No.: 276,218

[22] Filed: Nov. 23, 1988

Related U.S. Application Data

[62] Division of Ser. No. 55,180, May 28, 1987, Pat. No. 4,804,717.

[51] Int. Cl.[4] .......... C08L 23/10; C08L 33/08; C08L 75/04; C08L 67/00

[52] U.S. Cl. .......... 525/127; 525/167.5; 525/172; 525/194; 525/227; 525/228

[58] Field of Search .......... 525/127, 172, 194, 227, 525/228, 167.5

[56] References Cited

U.S. PATENT DOCUMENTS

| | | | |
|---|---|---|---|
| 4,153,596 | 5/1979 | Oertel et al. | 525/375 |
| 4,308,362 | 12/1981 | Wiezer et al. | 525/375 |
| 4,314,933 | 2/1982 | Berner | 525/375 |
| 4,520,171 | 5/1985 | Dineley et al. | 525/375 |
| 4,696,959 | 9/1987 | Chang et al. | 525/375 |

*Primary Examiner*—Carman J. Seccuro

*Attorney, Agent, or Firm*—Renner, Otto, Boisselle & Sklar

[57] ABSTRACT

The present invention relates to novel compounds corresponding to the formula:

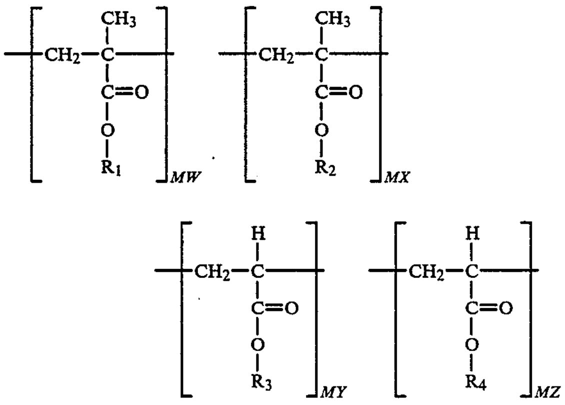

wherein $R_1$ and $R_4$ may be the same or different, and each is a lower alkyl radical; $R_2$ and $R_3$ may be the same or different, and each is a substituted piperidine radical; M is equal to the total number of monomer units in the polymer chain, and is of a magnitude sufficient to provide a polymer having a molecular weight of at least 500; W is equal to at least 0.5, X is equal to at least 0.1 but not greater than 0.2, Y is equal to at least 0.1, Z is equal to at least 0.05 but not greater than 0.2, and W plus X plus Y plus Z is equal to 1.

These novel compounds are useful as stabilizers for a wide variety of organic materials and are prepared by transesterification of a suitable acrylate-methacrylate copolymer.

20 Claims, No Drawings

POLYMETIC HINDERED AMINE LIGHT STABILIZERS

This is a divisional of co-pending application Ser. No. 055,180 filed on May 28, 1987, now U.S. Pat. No. 4,804,717.

BACKGROUND OF THE INVENTION

This invention relates to new materials that are useful for the stabilization of organic polymeric material normally tending to deteriorate. In particular, the invention relates to new materials that are useful for the protection of synthetic polymers against the harmful degradative effects, such as discoloration and embrittlement, caused by exposure to light, especially ultraviolet light.

It is known that actinic radiation, particularly in the near ultraviolet region, has a deleterious effect on both the appearance and properties of organic polymers. For example, normally colorless or light colored polyesters turn yellow on exposure to sunlight, as do such cellulosic polymers such as cellulose acetate. Polystyrene discolors and cracks, with an accompanying loss of its desirable physical properties, when exposed to actinic light, while vinyl resins, such as polyvinyl chloride and polyvinyl acetate, spot and degrade. The rate of air oxidation of polyolefins such as polyethylene and polypropylene is materially accelerated by ultraviolet light.

It has been proposed to stabilize polymeric materials against ultraviolet light deterioration by the use of several different types of ultraviolet absorbers. Thus, U.S. Pat. No. 3,004,896 discloses for this purpose 2(2-hydroxyphenyl)benzotriazole derivatives, while U.S. Pat. No. 3,189,630 discloses certain metal salts of hydroxybenzoic acids which are useful as actinic stabilizers in synthetic polymers.

It is known from U.S. Pat. No. 3,705,166 to use monomeric acrylic acid derivatives which contain at least one piperidinyl group having a sterically hindered nitrogen atom as light stabilizers in organic polymers. However, these acrylic acid derivatives are too readily volatile. Furthermore, the possibility of incorporation the monomeric additive in certain substrates is pointed out. However, this has the disadvantage that the polymer structure is destroyed by the additive incorporated and this can lead to a change, which is difficult to regulate, in the characteristics of the substrate to be protected.

A drawback that is common to the use of all such stabilizer molecules is that the small size of such molecules provides them with mobility. This can result in their diffusion to the surface of the polymeric article. On the surface, these stabilizer molecules can be inadvertently removed by mechanical means, resulting in the loss of their stabilizing effect. Also, the comparatively low boiling points of these materials, compared to the temperatures encountered by the synthetic polymers during processing, such as during extrusion, or molding, can as well lead to the loss of the stabilizer molecules. For these reasons, light stabilizer molecules are needed that can be incorporated into polymeric structures, that will produce non-volatile, non-leaching light stabilizers for polymer protection.

To this end, high molecular weight, polyfunctional polymeric light stabilizers have been prepared by incorporating light stabilizing moieties into polymerizable monomeric structures, and then homopolymerizing the resulting compounds to obtain the desired polymeric light stabilizers. Also, these light stabilizer-containing monomeric compounds have been copolymerized with suitable comonomers to produce such polymers. Such teachings are disclosed, for example, in Ger. Offen. 2,748,362 and in U.S. Pat. Nos. 4,078,091, 4,205,151 and 4,210,612. However, the particular mechanism of light stabilizing activity of the light stabilizing component in the monomer necessitates careful and limited choice of the system used to prepare the polymers from such monomeric structures.

For example, Ger. Offen. 2,748,362 in its Example 1 polymerizes the monomer 4-methacryloyloxy-2,2,6,6-tetramethylpiperidine in the presence of azodiisobutyronitrile (AIBN) at 95° C. to form a polymeric product having a molecular weight of about 5100. Other examples produced copolymers of two different monomeric species, one of which is a hindered acrylic-substituted piperidine, at molecular weights in the range from 1,750 to 9,720, where reported, except in one case, Ex. 38, where a molecular weight of 17,780 was reported. Even so, all of these stabilizing materials possessed relatively low molecular weights, and probably are more aptly characterized as oligomers rather than as polymers. At a molecular weight of 10,000 for example, with a monomer M. Wt. of 500, which is representative, there would only be 20 repeating units in the chain. Many theoreticians believe that this is probably about the minimum number required for the demonstration of polymer characteristics such as, for example, the polymeric Tg.

U.S. Pat. No. 4,205,151 describes polymeric N-substituted maleimides. The polymer may contain as many as 2000 repeating units, and molecular weights may be in the range from about 1,000 to 100,000. These materials are said to function as antioxidants, and to have the advantage of being non-absorbable through the walls of the gastrointestinal tract, to permit use in plastics that may be in contact with foodstuffs.

U.S. Pat. No. 4,210,612 describes homopolymeric and copolymeric light stabilizers characterized by the recurring structural unit,

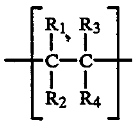

there being N-heterocyclic rings on the side substituents, which may be hindered amines. These polymeric products are said to have good solubility in or compatibility with host polymers, and to manifest a high resistance to extraction. The molecular weights of the stabilizers may be from more than 500 up to 150,000, preferably 500 to 50,000, and most preferably, 1,000 to 20,000, of which the active stabilizing component may be present to a controlled degree.

U.S. Pat. No. 3,705,166 suggests a different approach. Acrylic esters of hindered piperidines, it is said, may be graft-copolymerized to other polymers, or may be copolymerized with other monomers to form polymeric substances having excellent light stability. Basically, however, the patent seems to be concerned with the incorporation of the monomeric acrylic esters of hindered piperidines into synthetic polymers requiring stabilization.

Still another approach to stabilization is described in the Uhrhan et al. patent, 4,145,512. Permanently stabilized polyurethanes are prepared by reacting with a diisocyanate or with an isocyanate prepolymer a 2,2,6,6-tetraalkyl piperidine derivative having two H-active reactive groups that react with isocyanate groups. The quantity of reactive stabilizer incorporated in the polyurethane may be from 0.05% to 5% by weight based on the polyurethane solids content.

Permanently stabilized polymers are also produced by the process of the Oertel et al. patent, 4,153,596. Compounds based on 2,2,6,6-tetraalkyl piperidines, that contain one or more reactive groups such as methylol groups, are reacted with polymers that are to be stabilized. The stabilizing radical becomes attached to O— or N— atoms of the polymer. The polymers to be stabilized must themselves be reactive, and contain reactive hydrogens on O— or N— atoms. For example, polymers containing hydroxyl, primary and/or secondary amino groups, amide groups, imide groups, urethane groups or urea groups (in which case the —N-H—CO—NH-group may even be part of a complicated structure), may be used. Those polymers identified as suitably reactive include, for example, polyvinyl alcohol or copolymers of vinyl alcohol, polyamides or copolyamides based on lactams, diamines, dicarboxylic acids or aminocarboxylic acids, copolyamides containing proportions of secondary amino groups (incorporation of diethylene triamine or the like), aromatic or heterocyclic copolyamides, gelatin, (co)polymers of (meth)acrylamide, polyhydrazides, polysemicarbazides or polymers containing —CO—NH—NH—, —O—CO—NH—NH— or —NH—CO—NH—NH-groups (optionally as part of complicated structures such as, for example, —N—H—CO—NH—NH—CO—NH), as for example in segmented polyurethane (ureas). The reactive sites of polymers such as these may be present both as part of the backbone chain, as a side chain, and also as terminal groups.

The stabilized polymers of the Oertel et al. patent are generally obtained by adding to the polymers, preferably in solution, from 0.05% to 5% by weight (preferably from 0.1% to 3.0% by weight and, with particular preference, from 0.1% to 2.0% by weight) of the 2,2,6,6-tetraalkyl piperidine compounds containing one or more reactive groups, processing the polymers into shaped articles and reactively attaching the stabilizers to the polymers before, during or after the shaping stage.

The reaction process of the Oertel et al. patent is preferably employed for incorporating reactive 2,2,6,6-tetraalkyl piperidine compounds in and for stabilizing segmented polyurethane elastomers which, in addition to urethane groups, also contain NH—CO—NH groups formed by reaction of isocyanate groups with water and/or compounds containing terminal $NH_2$-groups (for example diamines, dihydrazides, carbodihydrazide, semicarbazide hydrazides or hydrazine) and which have a substantially linear, segmented molecular structure, are soluble before shaping in highly polar solvents, such as dimethyl formamide or dimethyl acetamide, and of which the characteristic segments may be characterized by the following formula moiety:

$$—Y_1—NH—CO—NH—X_1—NH—CO—NH—,$$

this segment optionally having been formed from the reaction of an NCO-preadduct $OCN—Y_1—NCO$ with a chain extender $H_2N—X_1—NH_2$.

As in earlier developments, Oertel et al. has as their purpose the production of permanently stabilized polymers that were used for their own sakes, and not as additives to host polymers to stabilize the host polymers.

A more recent patent, Wiezer et al., 4,308,362, discloses copolymers of one or more polyalkyl piperidines of the formula

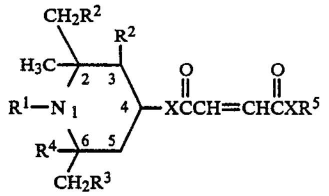

I with one or more comonomers of the formula

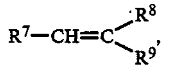

II the resulting copolymer having a molecular weight of from about 1000 to about 10,000, wherein in the monomers of the formula (I) $R^1$ is hydrogen or $C_1$ to $C_{18}$-alkyl, preferably hydrogen or $C_1$ to $C_4$-alkyl and especially hydrogen, $R^2$ and $R^3$ are either the same and represent hydrogen or $C_1$ to $C_5$-alkyl, preferably hydrogen or methyl and especially hydrogen, in which case $R^4$ is methyl. Other formulae are also disclosed. These copolymers are said to be suitable for the stabilization of organic polymers against degradation by light and heat, and are also said to be characterized by low volatility, good migration stability, and good compatibility with the polymers to be stabilized, in spite of their polymeric character.

As in Examples 6 and 7 of this patent respectively, these materials can be formed by ester interchange or by direct reaction with a carboxylic acid-functional polymer, as well as by copolymerization of monomers.

Fu et al., U.S. Pat. No. 4,413,096 is directed to a terpolymer having ethylene monomer units, piperidine substituted acrylate or methacrylate units, and optionally substituted acrylate to methacrylate monomer units.

Offenlegungsschrift 27 48 362, relates to copolymers of piperidine and methyl acrylate or methyl methacrylate, rather than piperidine modified acrylate-methacrylate copolymers.

SUMMARY OF THE INVENTION

In the present invention, the light stabilizing moiety is incorporated into a pre-existing intermediate polymer, to produce a light stabilizing additive that is polymeric in nature, and that is intended for incorporation in a host polymer to stabilize the host polymer. The pre-existing intermediate polymer may be prepared by conventional means. Thus the pre-existing intermediate polymer can be selected, or custom produced, to have the most advantageous properties in view of the contemplated end use.

Such a pre-existing intermediate polymer or copolymer must contain groups that can react with or be replaced by auxiliary functional groups on the light stabilizing molecule. In this manner the light stabilizing moiety is incorporated into the polymeric structure.

In preparing derivatized polymers that contain light stabilizing moieties, a replacement or transesterification reaction is generally used to replace lower alkyl ester groups in a polymer or copolymer containing such groups, by hydroxyl-containing light stabilizing molecules.

Still another aspect of the invention resides in the novel light stabilizing polymeric materials produced by the replacement reactions. Since these reactions can be caused to proceed to controlled extents, the resulting polymeric materials may have novel structures. For example, the derivatized polymer produced by a transesterification reaction will contain some unreplaced ester groups, together with light stabilizing moieties inserted in the polymer as replacements for the balance of the original ester groups. This permits the custom design of polymeric molecules and their properties.

The derivatized polymers produced by the processes of this invention are especially useful as light stabilizing additives for many host synthetic polymeric materials. That is, the inserted light stabilizing moieties can continue to exert their properties even though chemically coupled to a polymeric molecule.

In their role as light stabilizers the polymeric compounds herein described are used in the amount that can be expressed conveniently but roughly as being from about 0.1% to about 5% by weight of the host polymeric system being stabilized. The amount to be used can be expressed in more precise fashion in terms of amount of nitrogen (N) by weight based on the host polymer. So expressed, the amount used is sufficient to incorporate in the host polymer from about 0.00035 g N to about 0.3 g N per 100 g of the host polymer, but preferably, not above about 0.175 g N per 100 g of the host polymer. The polymeric stabilizer of the invention may be used in combination with other UV stabilizers, such as 2-(2-hydroxyphenyl) benzotriazoles, 2-hydroxybenzophenones, salicylates, nickel salts, and especially benzoates.

DETAILED DESCRIPTION OF THE INVENTION

The novel compounds of the present invention correspond to the formula:

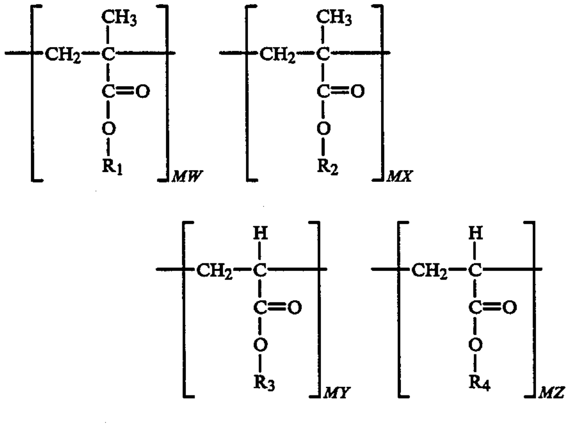

wherein $R_1$ and $R_4$ may be the same or different, and each is a lower alkyl radical; $R_2$, and $R_3$ may be the same or different, and each is a substituted piperidine radical; M is equal to total number of monomer units in the polymer chain, and is of a magnitude sufficient to provide a polymer having a molecular weight of at least 500; W is equal to at least 0.5, X is equal to at least 0.1 but not greater than 0.2, Y is equal to at least 0.1, Z is equal to at least 0.05 but not greater than 0.2, and W plus X plus Y plus Z is equal to 1.

These novel compounds are prepared by transesterification of a suitable acrylate-methacrylate copolymer. The preferred starting copolymer is a 70% methyl methacrylate 30% ethyl acrylate copolymer which can be purchased commercially, or prepared as described in the specific examples hereinafter.

The compounds of this invention are useful as stabilizers of organic material normally subject to thermal, oxidative or actinic light deterioration. Materials which are thus stabilized include synthetic organic polymeric substances including homopolymers, copolymers, and mixtures thereof, such as vinyl resins formed from the polymerization of vinyl halides or from the copolymerization of vinyl halides with unsaturated polymerizable compounds, e.g., vinyl esters, $\alpha,\beta$-unsaturated acids, $\alpha,\beta$-unsaturated esters, $\alpha,\beta$-unsaturated ketones, $\alpha,\beta$-unsaturated aldehydes and unsaturated hydrocarbons such as butadienes and styrene; poly-$\alpha$-olefins such as high and low density polyethylene, cross-linked polyethylene, polypropylene, poly(4-methylpentene-1) and the like, including copolymers of $\alpha$-olefins; such as ethylene-propylene copolymers, and the like dienes such as polybutadiene, polyisoprene, and the like including copolymers with other monomers; polyurethanes such as are prepared from polyols and organic polyisocyanates, and polyamides such as polyhexamethylene adipamide and polycaprolactam; polyesters such as polyethylene terephthalates; polycarbonates such as those prepard from bisphenol-A and phosgene; polyacetal such as polyethylene terephthalate polyacetal; polystyrene, polyethylene oxide; polyacrylics such as polyacrylonitrile; polyphenylene oxides such as those prepared from 2,6-dimethylphenol and the like; and copolymers such as those of polystyrene containing copolymers of butadiene and styrene and those formed by the copolymerization of acrylonitrile, butadiene and/or styrene.

Other materials which can be stabilized by the compounds of the present invention include lubricating oil of the aliphatic ester type, i.e., di(1,2-ethylene)-azelate, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, cutting fluids, waxes, resins, and the like salts of fatty acids such as soaps and the like; and alkylene glycols, e.g., $\beta$-methoxyethyleneglycol, methoxytriethyleneglycol, triethylene glycol, octaethyleneglycol, dibutyleneglycol, dipropyleneglycol and the like.

The compounds of this invention are particularly useful as UV light stabilizers, especially for the protection of polyolefins, for instance, polyethylene, polypropylene, poly(butene-1), poly(pentene-1), poly(3-methylbutene-1), poly(4-methylpentene-1), various ethylene-propylene copolymers, various ethylene-butylene copolymers, and the like. The compounds of this invention also have particular utility in coatings including those based on acrylic polymers and copolymers, polyurethane polymers and copolymers, and alkyd resins to name but a few.

In general, the polymeric stabilizers of this invention are employed from about 0.01% to about 5% by weight of the stabilized composition, although this will vary with the particular substrate and application. An advantageous range is from about 0.05% to about 2% and especially 0.1% to about 1%.

For addition to host polymeric substrates, the polymeric stabilizers can be blended before polymerization or after polymerization, during the usual processing operations, for example, by hot-milling, the composition then being extruded, pressed, blow molded or the like into films, fibers, filaments, hollow spheres and the like. The heat stabilizing properties of these compounds may advantageously stabilize the host polymer against degradation during such processing at the high temperature generally encountered. Where the host polymer is prepared from a liquid monomer as in the case of styrene, the polymeric stabilizer may be dispersed or dissolved in the monomer prior to polymerization or curing.

These polymeric stabilizers can also be used in combination with other additives such as antioxidants, sulfur-containing esters such as distearyl-$\beta$-thiodipropionate (DSTDP), dilauryl-$\beta$-thiodipropionate (DLTDP) in an amount of from 0.01% to 2% by weight of the organic material, and the like, pour point depressants, corrosion and rust inhibitor, dispersing agents, demulsifiers, antifoaming agents, fillers such as glass or other fibers, carbon black, accelerators and the other chemicals used in rubber compounding, plasticizers, color stabilizers, di- and tri-alkyl- and alkylphenyl-phosphites, heat stabilizers, ultraviolet light stabilizers, antiozonants, dyes, pigments, metal chelating agents, dyesites and the like. Often combinations such as these particularly the sulfur containing esters, the phosphites and/or the ultraviolet light stabilizers will produce superior results in certain applications to those expected from the properties of the individual components.

The following formula represents co-stabilizers which are in certain instances very useful in combination with the polymeric stabilizers of this invention:

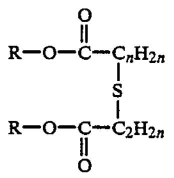

wherein R is an alkyl group having from 6 to 24 carbon atoms; and n is an integer from 1 to 6. Especially useful compounds of this type are dilauryl-$\beta$-thiodipropionate and distearyl-$\beta$-thiodipropionate. The above co-stabilizers are used in the amount of from 0.01% to 2% by weight of the host material, and preferably from 0.1% to 1%.

Although the compounds of this invention may to some degree also be effective as thermal stabilizers, if the processing of the host polymer is carried out at high temperatures it is advantageous to incorporate additional antioxidants.

In most applications, it is desirable to incorporate into the resin composition sufficient thermal antioxidants to protect the host plastic against thermal and oxidative degradation. The amount of antioxidant required will be comparable to that of the actinic stabilizer, namely, from about 0.005% to 5% and preferably from 0.01% to 2% by weight. Representative of such antioxidants are phosphite esters, such as triphenylphosphite and dibutyl-phosphite and alkyl arylphosphites such as dibutylphenylphosphite, and the like.

The best results have been obtained with the preferred class of thermal antioxidants, the hindered phenols. These compounds have been found to provide the best thermal stabilization with the least discloration in the compositions of the invention. Among these phenolic antioxidants are included the following, which are representative:

1. 2,6-di-tert-butyl-4-methylphenol
2. 2,6-di-tert-butylphenol
3. 2,2'-methylene-bis(6-tert-butyl-4-methylphenol)
4. n-octadecyl 3-(3,5-di-tert-butyl-4-hydroxyphenyl)-propionate
5. 1,1,3-tris(3-tert-butyl-6-methyl-4-hydroxyphenyl)butane
6. pentaerythrityl tetrakis[3-(3,5-di-tertbutyl-4-hydroxyphenyl)propionate]
7. di-n-octadecyl (3,5-di-tert-butyl-4-hydroxybenzyl) phosphonate
8. 2,4,6-tris(3,5-di-tert-butyl-4-hydroxybenzyl)mesitylene
9. tris(3,5-di-butyl-4-hydroxybenzyl) isocyanuarte.

The above phenolic antioxidants are known and many are commercially available and are used in the amount from about 0.025% to 5%, and preferably 0.01% to 2% by weight, based on the polymer. A more complete description of these hindered phenols appears in U.S. Pat. No. 4,007,157, from col. 3, line 10, through col. 8, line 25, which description is incorporated herein by reference. Other suitable hindered phenolic compounds are either identified or referenced in U.S. Pat. No. 3,920,661, col. 5, the entire text of which is also incorporated herein by reference.

In designing a polymeric stabilizer for incorporation in a host polymer, certain important properties of each must be kept in mind for good results. There must be compatibility between the polymeric stabilizer and the host polymer. Compatibility is important because the host polymer and polymeric stabilizer must form a stable blend when the stabilizer is incorporated in the host in a useful amount. Compatibility depends among other things on the molecular weight, polarity, and solubility parameter of each of the stabilizer and the host. In use, generally the stabilizer and host would be in the form of two powders which would be blended together, then extruded. The extruded strand would then often be chopped up and reextruded. The stabilizer must be able to be mixed easily with the powdered or granulated host polymer, and process well. Thus the glass transition temperature (Tg) of the stabilizer must be sufficiently close to that of the host polymer so that blending and processing characteristics are acceptable; it must be friable and not sinter. Also, the physical form of the stabilizer is important, i.e., whether it is a rubber or a solid. The amount of the stabilizer required for use is also important.

All of these features are controlled by the monomers used in making the carrier polymer portion of the stabilizer, and by the degree of incorporation of the hindered amine group in the stabilizer. One of the advantages of the invention is that these can be controlled and adjusted for particular end uses, for optimizing the properties of the stabilized host polymer.

The polymeric stabilizing materials of this invention may be prepared by the reaction of such hydroxyl- or amino-containing light stabilizer moieties with the carboxylic acid group containing carrier polymers that have been pre-esterified with lower alcohols, to make the desired polymeric stabilizing materials by interesterification.

The reaction products produced by transesterification are always ester mixtures, since the transesterification reaction is an equilibrium reaction and never results in 100% replacement, even if an effort is made continuously to remove a lower alkanol reaction product. The reaction product is therefore analogous in many ways to a terpolymer product.

The first step in the transesterification techniques is that of synthesizing the desired intermediate, the polymeric ester. This is generally done by copolymerizing a mixture of an acrylic acid ester and a methacrylic acid ester to make a copolymeric ester intermediate. The ester monomers generally are those of alkanols, preferably lower alkyl alcohols.

Interestingly, the poly(alkyl methacrylates), such as poly(methyl methacrylate), will not undergo transesterification. Polymers of alkyl esters of acrylic acid do undergo transesterification. However, acrylate ester polymers generally have Tg values that are too low to be useful. In contrast, methyl methacrylate homopolymer of reasonable molecular weight has a Tg of 105° C., which is considerably higher than the Tg of the homopolymers of ethyl acrylate and butyl acrylate, for example. Consequently, to practice the present invention, an intermediate copolymer is preferred initially from a mixture of at least one alkyl acrylate monomer an at least on alkyl methacrylate monomer. This mixture of monomers is made up to produce a copolymer that is transesterifiable but that has a Tg such that the copolymer is a friable solid at 100° F.

Consequently, according to one preferred embodiment of the invention, the intermediate polymeric ester is prepared by copolymerizing a monomer mixture that includes some methyl methacrylate, together with one or more alkyl (preferable C 1) ester monomers of acrylic acid. The preferred monomer esters for copolymerization are methyl methacrylate and ethyl acrylate in admixture. This produces a copolymer having a Tg value intermediate between the Tg values of the homopolymers of methyl methacrylate and of ethyl acrylate, respectively. However, instead of methyl methacrylate and ethyl acrylate, other lower alkyl esters of these acids may be used, respectively. This process of making polymeric stabilizing additives permits unique control over the chemical structure of the end product and its properties. For example, control over the proportions of the respective esterifying groups present permits adjustment of the glass transition temperature (Tg) of the polymeric stabilizer, and of compatibility with the host polymer, such as polypropylene, in which the polymeric stabilizer is to be incorporated. In the transesterification process, the method of preparing the desired polymeric hindered amine materials is to attach the hydroxyl- or amino-containing light stabilizer moieties to the intermediate polymer via the replacement of a transesterifiable group on the intermediate polymer with the light stabilizer moiety. An example of this type of reaction is the transesterification of a previously prepared lower alkyl ester of the repeating acrylic acid ester unit of the intermediate polymer, preferably the ethyl ester of an acrylic acid repeating unit in the intermediate polymer, with 4-(2,2,6,6-tetramethyl)-piperidinol, for example.

In one preferred embodiment, a polymeric stabilizer according to the invention is a polymeric mixed ester or ester-amide of the formula set forth hereinbefore, wherein $R_2$ and $R_3$ may be the same or different, and each is a 2,2,6,6-tetraalkylpiperidine.

The invention may be better understood from the following specific examples, which are intended to be illustrative. Throughout this application, all references to parts and percentages are by weight, and all temperatures are in degrees Celsius, unless stated otherwise. Examples 1 and 2 describe the production of intermediate copolymer esters. The remaining examples describe the use of such intermediate copolymeric esters in the production of polymeric stabilizers.

EXAMPLE 1

Preparation of a 1:1:MMA:EA Copolymer Intermediate

A 1 liter resin kettle, equipped with mechanical stirrer, reflux condenser, thermometer in thermowell, and adapters allowing for nitrogen purge and two addition funnels, was charged with a solution of 25 g of ethyl acrylate and 100 ml toluene. This was heated with stirring and gentle nitrogen purge to reflux over the course of one half hour.

At this point, a solution containing 75.1 g of ethyl acrylate, 100.0 g of methyl methacrylate, and 50 ml toluene was added over the course of one hour; at the same time, a solution of 10.0 g of Luazo 70 (2-t-butylazo 2-cyano-4-methylpentane) in 50 ml toluene was added over the same time period plus an additional hour. After one-half hour more of stirring at reflux, a solution of 1.0 g of Luazo 70 in 25 ml of toluene was added to complete the polymerization of any unreacted monomers.

Upon cooling, the volume of the hazy liquid product was 385 ml, with a percent solids content of 52.0%. Gas chromatographic analysis indicated very low levels of monomers—0.021 wt % ethyl acrylate and 0.024 wt % methyl methacrylate.

EXAMPLE 2

Preparation of 2:1::MMA:EA Copolymer Intermediate

A 1.0 liter resin kettle, equipped with mechanical stirrer, thermometer in thermowell, reflux condenser, and adapters allowing for nitrogen purge and two addition funnels, was charged with 33.3 g of ethyl acrylate and 250 ml toluene. This was heated to reflux with stirring.

At that point the addition of two solutions began: a solution of monomers, consisting of 266.7 g of methyl methacrylate and 100.0 g of ethyl acrylate, and a solution of 5.0 g of Luazo 70 and 100 ml of toluene. The solution of monomers was added over the course of one hour; the initiator solution, over the course of two hours. This was followed by a period of one-half hour of stirring at reflux, followed by the addition of a solution of 2.0 g Luazo 70 in 50 ml toluene, which was added over the course of 20 minutes. A final period of 2 hours and 40 minutes of stirring at reflux completed the reaction.

Upon cooling, the hazy solution was determined to contain 53% solids, by weight.

EXAMPLE 3

Transesterification of the 1:1::MMA:EA Copolymer with 2,2,6,6-Tetramethyl-4-piperidinol A 500 ml resin kettle, equipped with mechanical stirrer, thermometer in thermowell, reflux condenser, and adapter to allow for nitrogen purge and an addition funnel, was charged with 50 ml of the 1:1::MMA:E copolymer/xylene solution of Example 1 and 200 ml fresh xylene. This was heated with stirring to reflux to remove any traces of moisture, then cooled to room temperature.

Then 20.1 g (0.125 moles) of 98% 2,2,6,6-tetramethyl-4-piperidinol was added to the reactor contents and heating was resumed with stirring. After reflux was resumed, 4.1 g of a 25% solution of sodium methoxide in methanol (0.0188 moles; 15 mole % based on hindered amine) was gradually added dropwise over the course of 15 minutes. Reflux conditions were maintained for 16 hours as a total of 120 ml of overheads were removed.

The reaction mixture was then cooled to room temperature, then treated with 200 ml of water to remove catalyst and any unreacted piperidinol. The phases where then separated, and the organic phase was dried over anhydrous sodium sulfate. The bulk of the xylene was removed by atmospheric pressure distillation, with the residue being stripped off on a rotary evaporator under reduced pressure. After being vacuum dried over 60° C., the residue amounted to 34.2 g. An amine equivalent analysis gave a value of 2.48 meq/g, which calculates to 68.6% replacement of the ethyl groups of the copolymer with the 4-(2,2,6,6-tetramethylpiperinyl) groups.

EXAMPLE 4

Transesterification of the 2:1::MMA:EA Copolymer with 4-(2,2,6,6-Tetramethyl)piperidinol A 500 ml resin kettle, equipped with mechanical stirrer thermometer in thermowell, reflux condenser, and adapter allowing for nitrogen purge and an addition funnel, was charged with 47.2 g of the 53% solids product of Example 2 (the 2:1::MMA:EA copolymer in xylene) and 250 ml fresh xylene. This was heated to reflux with stirring to remove any traces of water, then cooled to room temperature.

At that point 20.1 g (0.125 moles) of 98% 4-(2,2,6,6-tetramethyl)piperidinol was added to the kettle and heating was resumed. When the temperature reached 60° C., the introduction of the catalyst, 4.1 g of a 25% solution of sodium methoxide in methanol (0.0188 moles; 15 mole % based on the piperidinol) was commenced, lasting some five minutes. The reaction solution was then held at reflux for several hours, with a total of about 10 ml of overheads being taken.

After cooling to room temperature, 200 ml of water was added to the reaction mixture with stirring. The phases were then separated. The organic phase was distilled at atmospheric pressure to remove the bulk of the xylene solvent, then stripped on a rotary evaporator under reduced pressure, with the residue being dried in a vacuum oven at 95° C. to constant weight. The product amounted to 31.5 g. An amine equivalent analysis gave a value of 2.57 meq/g. This calculated to a replacement of 100% of the ethyl groups and 8% of the methyl groups in the copolymer with the 4-(2,2,6,6-tetramethyl)piperidinyl groups.

EXAMPLE 5

Transesterification of the 2:1::MMA:EA Copolymer with 4-(2,2,6,6-Tetramethyl)piperidinol A 1.0 l resin kettle, equipped with mechanical stirrer, thermometer in thermowell, reflux condenser, and adapter allowing for nitrogen purge and an addition funnel, was charged with 94.3 g of the reaction product of Example 2 (the 2:1::MMA:EA copolymer solution in xylene), 33.5 g (0.2088 moles) of 98% 4-(2,2,6,6-tetramethyl)piperidinol, and 400 ml fresh xylene. This was heated with stirring.

When the temperature reached 70° C., the addition began of 6.8 g of a 25% solution of sodium methoxide in methanol (0.0313 moles, 15 mole % based on the piperidinol) to the clear, light yellow solution in the kettle; the addition taking 15 minutes. The reaction solution was held at reflux for several hours as a total of about 350 ml of overheads was taken.

Upon cooling, the unreacted piperidinol was removed from the mixture by filtration. The solid was washed several times on the filter with small volumes of fresh xylene. The crude, recovered piperidinol amounted to 17.2 g.

The filtrates were treated with heptane giving a light brown gum. The gum was taken up in acetone and precipitated in heptane. The precipitate was dried in a vacuum oven at 75° C. to constant weight. The yield of light yellow, friable solid was 1.0 g. Gas chromatographic analysis of this material indicated the presence of 1.29% unreacted 4-(2,2,6,6-tetramethyl)piperidinol by weight. An amine equivalent determination gave a value of 1.905 meq/g. Subtracting out the contribution of the 1.29% unreacted 4-(2,2,6,6-tetramethyl)-piperidinol gave a value of 1.823 meq/g, which calculates to a replacement of 68.7% of the ethyl groups by the 4-(2,2,6,6-tetramethyl)piperidinol groups.

EXAMPLE 6

A. Preparation of 3-Hydroxyethyl-2,2,5,5-tetramethylimidazolidine-4-one Reactant, using Ethylene Carbonate Alkylation A 2 liter 3-necked flask was equipped with mechanical stirrer. Dean Stark trap and dropping funnel and charged with 106.7 g of 2,2,5,5-tetramethylimidazolidin-4-one (0.75 moles) and 1 liter of azeotropically dried xylene. After the solution had been brought to reflux, 63 g of 50% aqueous sodium hydroxide solution was gradually added and water removed from the system. After about 2 hours, 44 ml of water (96.5% theoretical water and water of reaction) were collected.

The reaction mixture was then cooled and 67.5 g of molten ethylene carbonate added, then reflux was continued for 24 hours. The reaction mixture was then cooled again, and 50 ml water was added, after which the mixture was heated under gentle reflux for 3 hours.

Then the organic solution was dried by azeotropic distillation, cooled, and the inorganic solids removed by filtration. Evaporation of the organic solvent yielded the product as a thick liquid, wt 122.2 g. It was purified by distillation at 116°-118°/0.1-0.13 mm to give a white solid which was purified by recrystallization from heptane. The pure compound melted at 58°-60°. Its structure was determined by the spectral properties of the material. It was 3-hydroxyethyl-2,2,5,5-tetramethylimidazolidin-4-one.

B. Transesterification of the 1:1::MMA:EA Copolymer with the 3-Hydroxyethyl-2,2,5,5-tetramethylimidazolidin-4-one Reactant A 500 ml resin kettle, equipped with mechanical stirrer, thermometer in thermowell, reflux condenser, and adapter allowing for nitrogen purge and an addition funnel, was charged with 50 ml of the product of Example 1 (1:1::MMA:EA copolymer in xylene solution) and 150 ml fresh xylenes. This was heated to reflux to remove any traces of moisture then cooled to the vicinity of 100° C.

25.4 g (0.125 moles) of 92% 3-hydroxyethyl-2,2,5,5-tetramethylimidazolidin-4-one was added all at once as a powdered solid. After this addition was over, 4.1 g (0.0188 moles, 15 mole % based on the hindered amine) of 25% sodium methoxide in methanol solution was added over the course of five minutes. The reaction mixture was held at reflux for several hours with a total of about 120 ml of overheads being taken.

The reaction mixture was then cooled to room temperature and treated with 200 ml of water. The phases were separated. The water phase was extracted with methylene chloride, then discarded. The methylene chloride extracts were added to the xylene phases and the bulk of the solvents distilled off by atmospheric distillation, followed by stripping on a rotary evaporator under reduced pressure. Finally, the residue was dried in a vacuum oven at 60° C. to a constant weight.

The yield of product was a total of 51.1 g. An amine equivalent determination gave a value of 2.88 meq/g. After subtracting out the contribution afforded to this value by unreacted hindered amine, as determined by gas chromatographic analysis, the incorporation of the hindered amine in substitution for the ethyl groups was calculated to be 49.4%.

C. Transesterification of the 1:1::MMA:EA Copolymer with the 3-Hydroxethyl-2,2,5,5-tetramethylimidazolidin-4-one, with a Higher Incorporation A 500 ml resin kettle, equipped with mechanical stirrer, thermometer in thermowell, reflux condenser, and adapter allowing for a nitrogen purge and an addition funnel, was charged with 47.2 g of the reaction product of Example 1 (the 1:1::MMA:EA copolymer in xylene) and 250 ml of fresh xylenes. This was heated with stirring to reflux to remove any traces of water.

Then a warmed solution of 37.6 g (0.1875 moles, 50% excess based on "moles" of EA in polymer) of 93.2% 3-hydroxyethyl-2,2,5,5-tetramethylimidazolidin-4-one in 100 ml xylenes was added over the course of one hour and 20 minutes, after which time 6.1 g (0.028 moles, 15 mole % based on hindered amine) of sodium methoxide solution in methanol was added over the course of 15 minutes. The reaction solution was then held at reflux for several hours, during which time a total of 100 ml of overheads was taken. The reaction solution was then cooled to room temperature and treated with 100 ml of water with stirring. The phases were separated, the organic phase yielded only 1.5 g of residue upon evaporation and vacuum drying.

The aqueous phase was continuously extracted with methylene chloride. Evaporation of the methylene chloride solvent gave 30.2 g of crude material. This was taken up in acetone and precipitated into heptane. The residue was dried in a vacuum oven at 50° C. to constant weight. This was taken up in 2-propanol and precipitated into heptane. The precipitate was again dried in a vacuum oven at 50° C. to constant weight.

The light yellow, friable solid, weighing 13.4 g, was found to contain 0.43 meq/g of unreacted hindered amine starting material. Subtracting this from the determined amine equivalent of the whole sample of 2.75 meq/g calculated to a replacement of 68.9% of the ethyl groups by the hindered amine groups.

EXAMPLE 7

Transesterification of the 2:1::MMA:EA Copolymer with the 3-Hydroxyethyl-2,2,5,5-tetramethylimidazolidin-4-one Reactant A 500 ml resin kettle, equipped with mechanical stirrer thermometer in thermowell, reflux condenser, and an adapter allowing for nitrogen purge and an addition funnel, was charged with 47.2 g of the product solution of Example 2 (the 2:1::MMA:EA copolymer in xylene) and 250 ml of fresh xylenes. This was heated to reflux to remove any traces of water.

As this solution was being cooled to room temperature, a warmed solution of xylene containing 25.4 g (0.125 moles) of 92% 3-hydroxyethyl-2,2,5,5-tetramethylimidazolidin-4-one was added. After this addition was over, the reactor solution was heated to reflux as 4.1 g (0.0188 moles; 15 mole % based on hindered amine) of 25% sodium methoxide in methanol was added. The reaction mixture was held at reflux for several hours, during which time a total of 350 ml of overheads were taken, 200 ml of fresh xylenes having been added during the course of the distillation.

Upon cooling the reactor contents to room temperature, 200 ml of water and 200 ml of xylenes were added to the pot. The phases were separated. After evaporation of the xylene phase and vacuum drying, only 3.7 g of residue remained. Then the water phase was continuously extracted with methylene chloride. Distillation at atmospheric pressure removed the bulk of the solvent; the residual liquid was stripped on a rotary evaporator under reduced pressure and finally dried in a vacuum oven at 95° C. to constant weight.

An amine equivalent determination was corrected for the contribution of unreacted hindered amine found by GC determination, thus allowing a calculation of the degree of incorporation to be made. Thus it was indicated that 58.1% of the ethyl groups had been replaced by hindered amine groups.

Evaluation of Polymeric Stabilizers Produced by a Replacement Reaction

One thousand (1000) parts of polypropylene (Profax 6501, Hercules) was mixed with one part of tris-(3,5-ditertiarybutyl-4-hydroxybenzyl)isocyanuarate (Goodrite 3114, Goodrich) and 0.5 parts of calcium stearate. To this mixture was added 2.5 parts or 5 parts (as shown in Table 1 below) of the light stabilizer, to 2.5 parts of the light stabilizer and 2.5 parts of AM-340 (See Table 1) dissolved in 100 ml of methylene chloride. The mixture was stirred for 15 to 20 minutes and the ethylene chloride allowed to evaporate.

The resultant powder was dried, and then extruded into a 3/32 inch strand. The strand was then cut into pellets. The pellets were dried and then extruded into a broad (8") band through an extruder. The extruded band (film) was slit and a ¼" section of the film was oriented by drawing it at 175° F. at a 7:1 draw ratio. The dimensions of the oriented film were about 1×80 mils.

The several oriented film specimens thus prepared were mounted on aluminum frames and exposed in an Atlas Weather-Ometer, model 65 WR. At regular intervals, the test specimens were removed from exposure and their tensile strength measured on an Instron tensile tester.

Examples of the results observed in evaluating materials produced by the substitution in the intermediate copolymer, by transesterification, of hydroxyl- or amino-containing light stabilizing moieties (in particular, hydroxyl- or amino-group containing hindered amines) are reported in Tables 1 and 2, below.

A decrease in tensile strength, expressed as tenacity, over the tensile strength of the same formulation before exposure, is a measure of the deterioration of the physical properties of the polymer. "Failure" in this test is defined as a loss of 50% or more of the sample's tenacity, after exposure.

TABLE 1

Weather-O-Meter Testing Results
Substrate; Profax 6501 polypropylene, with 0.1 phr Goodrite 3114 and 0.05 phr calcium stearate
Control blank failure time: 613 hours (average of 3)

| Rate of Incorporation in the Host Polypropylene, phr | Failure times, in hours Ex. 3. | Ex. 4 | Ex. 6B | Ex. 7 | Data for Comparison |
|---|---|---|---|---|---|
| 0.25 | 3400 | 3600+ | 1430 | 2020 | — |
| 0.50 | 3900 | 3600+ | 2130 | 2930 | — |
| 0.25 + 0.25 AM-340* | 3600+ | 3600+ | 1970 | 2720 | — |
| 0.50 AM-340 | | | | | 1560 |
| 0.25 Tinuvin 770**: | | | | | 3500 |
| 0.25 Tinuvin 622***: | | | | | 2500 |

*AM-340: 2,4-di-t-butylphenyl 3-5-di-t-butyl-4-hydroxybenzoate
**Tinuvin 770: di-(2,2,6,6-tetramethylpiperidin-4-yl) sebacate
***Tinuvin 622: poly(1-beta-hydroxyethyl-2,2,6,6-tetramethyl piperidin-4-yl succinate)

TABLE 2

Weather-O-Meter Testing Results
Substrate; Profax 6501 polypropylene, with 0.1 phr Goodrite 3114 and 0.05 phr calcium stearate
Control blank failure time: 460 hours (average of 2)

| Rate of Incorporation in the Host Polypropylene, phr | Failure times, in hours Ex. 3. | Ex. 4 | Ex. 6C | Ex. 7 | Data for Comparison |
|---|---|---|---|---|---|
| 0.25 | 1410 | 2000 | 950 | 1710 | — |
| 0.50 | 1480 | 2050 | 1040 | 2000 | — |
| 0.25 + 0.25 AM-340 | 1870 | 2500+ | 1940 | 2000 | — |
| 0.50 AM-340 | | | | | 1410 |
| 0.25 Tinuvin 770 | | | | | 1620 |
| 0.25 Tinuvin 622 | | | | | 1460 |

EXAMPLE 8

Sodium Methoxide Catalyzed Transesterification Of A 7:3::MMA:EA Copolymer with 2,2,6,6-Tetramethyl-4-piperidinol A 1.0 liter flask equipped with mechanical stirrer, thermometer, and claisen tube attached to a distilling head, condenser and receiving flask, was charged with 52.0 g (0.33 mole) of 2,2,6,6-tetramethyl-4-piperidinol, 100.0 g (0.30 mole based on available ethyl acrylate monomer) of a 7:3 methyl methacrylate:ethyl acrylate copolymer (manufactured by DuPont under the trade designation ELVACITE EX-2612), and 175.0 g fresh xylene. After heating to 75° C., the flask was charged with 10.0 g of a 25% methanolic sodium methoxide solution. The temperature was slowly increased to 145° C. over 1 hour, with moderate distillation of volatiles. After 3 hours of reacting at this temperature, the mixture was cooled to 120° C. A second charge of 25% methanolic sodium methoxide (3.0 g) was added, and heating was continued at 130° C. under a moderate vacuum (11 inches) for 2 hours. A total of 100.0 g of volatiles were distilled. After cooling to 75° C., the flask was charged with 260 g of 10% aqueous acetic acid with stirring over 10 minutes. Stirring continued an additional 10 minutes and the mixture was allowed to separate. The lower aqueous layer was rapidly charged into a slowly stirring aqueous ammonium hydroxide solution (made from 59.9 g of 28% ammonium hydroxide and 110.0 g water), over a 10 minute period. The precipitated product was filtered, washed with water, and dried under vacuum to give 105.90 g of product which analyzed for 2.32 amine meq/g.

EXAMPLE 9

Lithium Amide Catalyzed Transesterification Of A 7:3::MMA:EA Copolymer with 2,2,6,6-Tetramethyl-4-piperidinol A 1.0 liter flask equipped with mechanical stirrer, thermometer, and claisen tube attached to distilling head, condenser and receiving flask, was charged with 52.0 g (0.33 mole) of 2,2,6,6-tetramethyl-4-piperidinol, 100.0 g (0.30 mole based on available ethyl acrylate monomer) of a 7:3 methyl methacrylate:ethyl acrylate copolymer (manufactured by DuPont under the trade designation ELVACITE® EX-2612), and 175.0 g fresh xylene. Lithium amide (1.38 g, 0.06 mole) was then charged into the flask, and the temperature was slowly increased to 136° C. over a period of 1 hour, with moderate distillation of volatiles. After 5 hours of reacting at this temperature, the mixture was cooled to 125° C. Heating was continued at this temperature under moderate vacuum (11 in.) for 2.5 hours. A total of 76.0 g of volatiles were distilled. After cooling to 60° C., the flask was charged with 260 g of 10% aqueous acetic acid with stirring over 10 minutes. Stirring continued an additional 10 minutes and the mixture was allowed to separate. The lower aqueous layer was rapidly charged over 10 minutes into a slowly stirring aqueous ammonium hydroxide solution (made from 59.0 g of 28% ammonium hydroxide and 110.0 g water). The precipitated product was filtered, washed with water, and dried under vacuum to give 119.0 g product with analyzed for 1.96 meq/g.

The materials of Example 8 was evaluated in comparison with commercial piperidine based stabilizers, to provide the data of Tables 3, 4 and 5.

TABLE 3

UV Exposure Series
Weather-O-Meter Exposure
FORMULATION: Profax 6501 Polypropylene
Calcium Stearate 0.05
Goodrite 3114[A] 0.1%
STABILIZER - As indicated

| COMPOUND | AMOUNT | HRS to 50% retention of Tenacity |
|---|---|---|
| Material of Example 8 | 0.5 | 4580 |
| Material of Example 8 | 0.25 | 3900 |
| Tinuvin 770[B] | 0.25 | 3590 |
| Tinuvin 622[C] | 0.25 | 2500 |

[A]Goodrite 3114-Tris(3,5-di-t-butyl-4-hydroxybenzyl) isocyanurate
[B]Tinuvin 770-Bis(2,2,6,6-tetramethyl-4-piperidinyl) sebacate
[C]Tinuvin 622LD-Dimethyl succinate polymer with 4-hydroxy-2,2,6,6-tetramethyl-1-piperidine ethanol

TABLE 4

| Xenon Arc Weather-O-Meter<br>High Density Polyethylene Thin Film<br>Marlex EAM 6006<br>2% $TiO_2$<br>0.05% Goodrite 3114 | | |
|---|---|---|
| HALS | % | Hrs To Failure |
| None | — | 1810 |
| Material of Example 8 | 0.1 | 4200 |
| Material of Example 8 | 0.2 | 6000 |
| Tinuvin 622 | 0.1 | 2310 |
| Tinuvin 622 | 0.2 | 4210 |

TABLE 5

| Weather-O-Meter Screening Series<br>Base Formulation 100 Himont PP6501<br>0.1 Irganox 1076[D]<br>0.05 Calcium stearate<br>0.5 stabilizer<br>SAMPLE FORM: 1 × 100 mil oriented film | |
|---|---|
| Stabilizer | % Retention of Tenacity @ 3000 hrs. |
| Material of Example 8 | 77 |
| Chimassorb 944[E] | 65 |
| Tinuvin 622 | 46 |
| Cyasorb UV3346[F] | 66 |

[D]Irganox 1010-Octadecyl 3-(3',5'-di-tert-butyl-4'-hydroxyphenyl)propanoate
[E]Chimassorb 944FL-N—N'-bis(2,2,6,6,-tetramethyl-4-piperidinyl)-1,6-hexanediamine, polymer with 2,4,6-trichloro-1,3,5-triazine and 2,4,4-trimethyl-1,2-pentanamine
[F]Cyasorb UV3346-Poly(6-Morpholino-s-triazine-2,4-diyl) [(2,2,6,6-tetra-methyl-4-piperidyl) iminohexa-methylene[(2,2,6,6-tetra-methyl-4-piperidyl)imino]]

Polymers having the following specific compositions have been made from a 70% MMA/30% EA copolymer, DuPont EX2612, following example 8 and analysed by proton NMR:

| | Monomers, Mole % | | | |
|---|---|---|---|---|
| Polymer Sample, | EA | MMA | TMPA | TMPMA |
| 1 | 9 | 53 | 18 | 19 |
| 2 | 8 | 53 | 20 | 19 |
| 3 | 11 | 52 | 17 | 20 |

EA = ethyl acrylate
MMA = methyl methacrylate
TMPA = tetramethylpiperdinyl acrylate.
TMPMA = tetramethylpiperdinyl methacrylate.

General—Transesterification (Replacement) Reactions

For the preparation of polymeric stabilizers by transesterification, many more materials may be interacted than the few mentioned in the specific examples. Any of the following reactants may be used in replacement reaction for reaction with an intermediate copolymeric ester. The intermediate ester copolymers containing lower alkyl esters suitable for the preparation of polymeric stabilizers by a replacement reaction, for example by transesterification, may be prepared by the polymerization or copolymerization of monomers selected from the group consisting of one or more $C_1$–$C_{15}$, preferably $C_1$–$C_4$ esters of acrylic acid with at least one $C_1$–$C_{15}$, preferably $C_1$–$C_4$ alkyl methacrylate. These copolymeric esters are reacted with one or more UV absorbers selected from the group consisting of 1. Hindered amines such as compounds having the formulae:

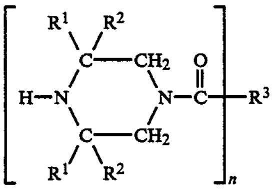

wherein $R^1$ and $R^2$ are independent of each other methyl or ethyl or together with the carbon to which they are bound form a cyclopentyl or cyclohexyl ring, which is unsubstituted or substituted with a methyl group;

n is an integer of from 1 to 2;

when n is 1, $R^3$ is preferably an alkyl group containing from 1 to 24 carbon atoms, or a phenyl group, each having at least one substituent that includes or is a reactive hydroxyl or amine group;

when n is 2, $R^3$ is an alkylene group containing from 1 to 10 carbon atoms, a phenylene group or the group having the formula

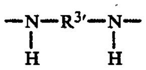

wherein $R^{3'}$ is an alkylene group containing from 1 to 10 carbon atoms, a phenylene or (lower)alkyl substituted phenylene group, wherein the alkylene group of phenylene group present in $R^3$ has at least one substituent that includes or is a reactive hydroxyl or amine group;

by the term alkyl as represented by $R^1$ and $R^2$ is intended methyl or ethyl, with methyl being the preferred substituent; representative of the cycloalkyl groups, as represented by $R^1$ and $R^2$, are cyclohexyl, cyclopentyl, 2-methylcyclohexyl, and 2-methyl, 3-methyl and 4-methylcyclohexyl, and 2-methyl and 3-methylcyclopentyl. The preferred cycloalkyl groups are cyclohexyl and 2-methylcyclohexyl;

or compounds having the formula

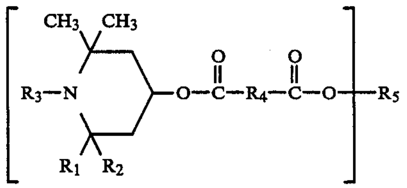

wherein $R_1$ and $R_2$ are lower alkyl or cycloalkyl, $R_3$ is hydrogen, alkyl, methoxyethyl, alkenyl, propargyl, benzyl or alkyl substituted benzyl, $R_4$ is alkylene, alkyl-thioalkyl or alkyl-oxo-alkyl, and $R_5$ is alkyl up to about 20 carbons, phenyl, or lower alkyl-substituted by a unit of the kind shown in brackets above, wherein $R_4$ or $R_5$ includes at least on reactive hydroxyl or amine group; or 2. Compounds having the formula

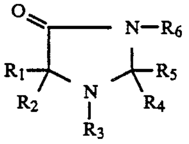

wherein:

$R_1$, $R_2$, $R_4$ and $R_5$ independently of one another each denote an alkyl group having 1 to 6 carbons, and in addition, $R_1$ and $R_2$ and/or $R_4$ and $R_5$, together with the ring carbon to which they are bonded respectively, may form a cycloalkyl ring having a total per ring of 5 or 6 carbons;

$R_3$ denotes: Hydrogen; the oxyl radical O.; alkyl having 1 to 6 carbons; hydroxyalkyl having 2 or 3 carbons; and alkyl of 2 to 6 carbon substituted with a reactive hydroxyl or amino group in other than the alpha position, and $R_6$ is alkyl having 2-6 carbon atoms substituted with a reactive hydroxyl or amino group in other than the alpha position.

An example of this class of compounds is 3-hydroxyethyl-2,2,5,5-tetramethylimidazolidinone.

The hindered amine formulae above are exemplary. There are many other useful hindered amines, such as those corresponding to the general formula:

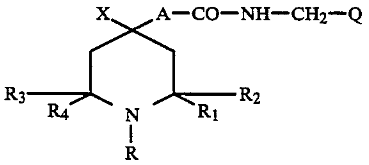

I in which

R represents hydrogen, a straight-chain or branched alkyl radical with 1 to 20 carbon atoms, an alkenyl radical with 3 to 5 carbon atoms, an aralkyl radical with 7 to 12 carbon atoms, the group $-CH_2-CH-R_6-OH$, where $R_6$ represents hydrogen, methyl or phenyl, the group $-CH_2-CH_2-CN$, the group $-CH_2-CH_2-COO$alkyl or the group

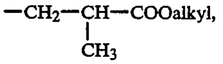

$R_1$ and $R_2$ and $R_3$ and $R_4$ may be the same or different, and each represents a straight-chain or branched alkyl radical with 1 to 6 carbon atoms, and $R_1$ and $R_2$, and $R_3$ and $R_4$, each pair taken together with the ring carbon atom to which they are attached respectively, may form a cycloalkyl ring with 5 to 7 carbon atoms, A represents

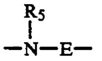 (a)

—O—E—, or (b)

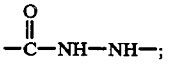 (c)

in case (a), X in the general formula I, above, represents hydrogen; in case (b), X represents hydrogen, the cyano group or a $-COOR_7$-group, where $R_7$ represents an alkyl radical, preferably a methyl or ethyl radical, and in case (c), X represents the OH-group.

$R_5$ represents hydrogen, a straight-chain or branched alkyl radical with 1 to 20 carbon atoms, a cycloalkyl radical with 5 to 12 carbon atoms, an aralkyl radical with 7 to 12 carbon atoms, a β-cyanoethyl radical, a β-alkoxycarbonyl alkyl radical preferably containing from 1 to 3 carbon atoms in the alkoxy moiety, an aryl radical with 6 to 10 carbon atoms, the group $-CH_2-CH(R_6)-OH$ (where $R_6$ represents hydrogen methyl or phenyl), the group:

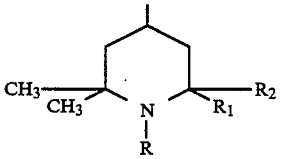

the group:

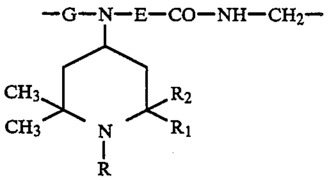

where G is an alkylene group with 2 to 6 carbon atoms, an aralkylene group with 8 to 10 carbon atoms or an arylene group with 6 to 8 carbon atoms; or the group:

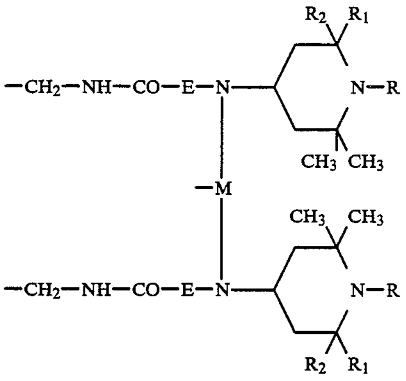

or the group $-E-CO-NH-CH_2$, where M is an alkane triyl group with 5 to 6 carbon atoms or an aralkane triyl group with 9 carbon atoms, and where E represents a $C_1$ to $C_3$ alkylene radical, the group $-CH_2CH(R_6)-O-$ (where $R_6$ is as defined above), the group $-(CH_2)_3-NH-$, the group $C_1$ and $C_3$-alkylene—CO—NH—NH—, or a single bond, the radical $-CO-NH-CH_2-$ never being directly attached twice to the nitrogen atom in formula (a), above, and Q represents an alkyl, aryl, aralkyl, or alkaryl group, providing one or more reactive groups for reaction with carboxyl, such reactive groups being preferably amino or hydroxyl but including amide groups, imide groups, and urea groups.

The following are specific examples of preferred compounds of this kind:

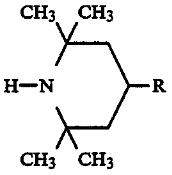

where R may be:

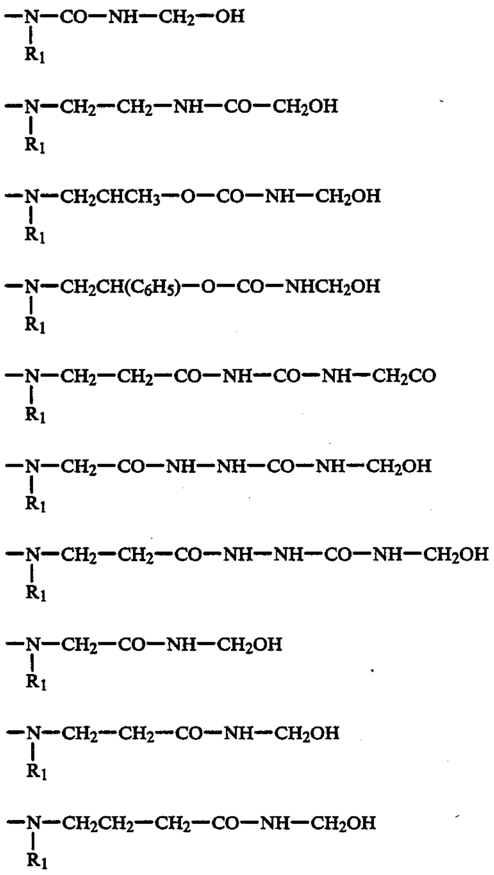

where $R_1$ may be:
—H
—$CH_3$
—$C_2H_5$
-isopropyl
-sec.butyl
-cyclohexyl
—$C_6H_{13}$
—$C_{12}H_{25}$
—$CHCH_3$—$CH_2$—$CH(CH_3)_2$
—$CH_2C_6H_5$
—$CH_2$—$CH_2$—CN
—$C_6H_5$
—$CH_2$—$CH_2OH$
—$CH_2$—$CHCH_3OH$
—$CH_2$—$CHC_6H_5OH$ Other exemplary light stabilizing hindered amines are:

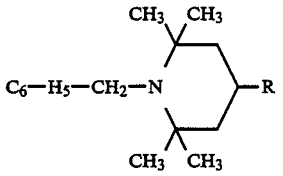

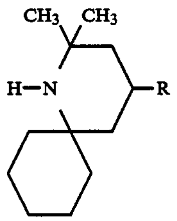

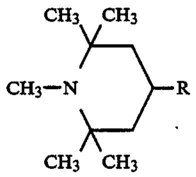

and

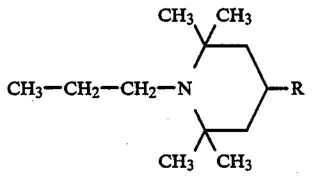

where R is as defined immediately above. In each instance above, the substituent —R terminates in —OH; but it could terminate in —$NH_2$ equally well.

3. 2,2,6,6-tetramethyl-4-piperidinyl esters of hydroxycarboxylic acids or aminocarboxylic acids, which may be represented by the general formula:

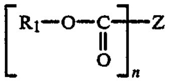

wherein $R_1$ is selected from the group consisting of

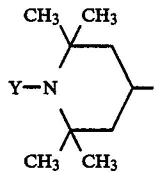

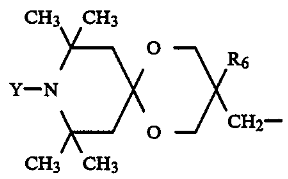

-continued

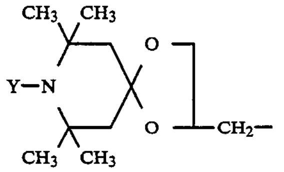

and

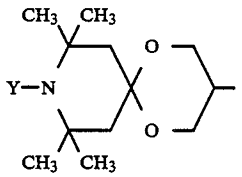

Y is selected from the group consisting of hydrogen and O;

$R_6$ is lower alkyl having from one to six carbon atoms;

n is selected from the group consisting of 1, 2, 3 and 4; and

Z is an organic radical having a valence from 1 to 4, Z having from one to about 20 carbon atoms, at least one of the valences of Z being occupied by hydroxy or amino substitution, and the remaining valence position being selected from the group consisting of hydrogen and 4. 4-piperidinol derivatives having the general formula

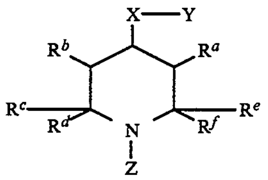

wherein:

X represents oxygen or $—NR_5$, $R_5$ being H, $C_1$–$C_{18}$ alkyl, or a group of the formula

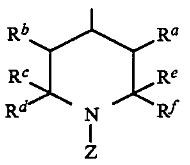

$R_a$ and $R_b$ are the same or different and each represents a hydrogen atom, an alkyl group, an alkenyl group of 1-5 carbons, an alkenyl group or an aralkyl group;

$R^c$ and $R^d$, and $R^e$ and $R^f$, are independently of each other the same or different, and preferably are all methyl, but may be alkyl or 1–6 carbons or selected from the group consisting of alkyl of 1-6 carbons or selected from the group consisting of alkyl of 1-6 carbons, phenyl, and an aralkyl group or a 5- or 6-membered aromatic heterocyclic group containing an oxygen, sulphur or nitrogen atom; or each of $R^c$ and $R^d$, and $R^e$ and $R^f$, respectively, together with the carbon atom to which they are attached, may represent a $C_5$ or $C_6$ cycloalkyl group or a group of the formula:

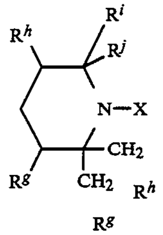

(wherein $R^g$ and $R^h$ are the same or different and each represents a hydrogen atom or a lower alkyl group, provided that $R^h$ does not represent a hydrogen atom when $R^g$ represents a lower alkyl group; $R^i$ and $R^j$ are the same or different and each represents a lower alkyl group; and X is as hereafter defined):

Z represents a hydrogen atom, an oxyl radical, an alkyl group, an alkenyl group, and alkoxyalkyl group, an aralkyl group, which is unsubstituted or which has one or more substituents in its aryl moiety, as 2,3-epoxypropyl group, a group of formula $—CH_2COOR^1$ (wherein $R^1$ represents an alkyl group, an alkenyl group, a phenyl group, an aralkyl group or a cyclohexyl group), a group of formula:

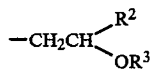

(wherein $R^2$ represents a hydrogen atom, a methyl group or a phenyl group and $R^3$ represents a hydrogen atom or an acyl group), an aliphatic acyl group or a group of formula $—COOR^4$ (wherein $R^4$ represents and alkyl group, a benzyl group or a phenyl group); and Y preferably represents hydrogen, or hydroxyalkyl, aminioalkyl, or alkyl substituted by both hydroxyl and amino groups, where the alkyl has up to about 20 carbon atoms, but may also represent any moiety that is compatible with the light stabilizing properties of the remainder of the molecule and that furnishes the requisite reactive group.

Conclusion

The present invention thus provides polymeric stabilizers generally, containing, as a part of the polymeric chain structure, from 0.05% by weight to about 60% by weight of the polymer of a functionally active light stablizing moiety attached to a carrier polymer. The moiety maybe, for example, one of the 2,2,6,6-tetraalkyl piperidine derivatives. The carrier polymer may be an addition polymer or copolymers. The functionally active light stabilizing moieties are built into the "carrier" polymer structure by chemical bonding, preferably in quantities of from about 0.1% to about 50% by weight of the polymeric stabilizer.

The amount of a particular polymeric stabilizer that should be incorporated in a host polymer, to be effective, can be expressed in terms of amount of nitrogen per unit weight of the stabilized host polymer. This is awkward, however, and simple trial and error tests indicate whether or not there is adequate stabilization by a given amount of any particular additive. For convenience, the polymeric stabilizer should be prepared so that it contains a sufficient degree of substitution by the functionally active moiety that an amount of polymeric stabilizer in the range from 0.01% to 5% by weight of the host polymer is effective to exert a stabilizing effect.

This range of addition is one often used and makes use of the polymeric stabilizers of the invention comfortable for those skilled in the art.

The light stabilizing polymeric compounds of the invention exhibit a synergistic effect when used in combination with AM-340, 2, 4-di-t-butylphenyl 3,5-di-t-butyl-4-hydroxybenzoate. This permits the use of smaller amounts of each and a smaller total amount of stabilizer additive for a given effect.

The amount of the light stabilizing moiety that is to be incorporated in the carrier polymer molecule, that is, the degree of substitution, can be selected in advance if the nature of the host polymer is known.

The excellent protection against discoloration and degradation afforded by the incorporation in a host polymer of a polymeric stabilizer produced according to the present invention often can be improved by the addition of other, conventional, compatible UV stabilizers and/or phenolic antioxidants.

Thus, for example, host polymers that have been stabilized by the addition thereto of polymeric stabilizers according to the present invention, containing approximately from 0.2% to 0.5% by weight of functionally active light stabilizing moieties which have been built into the molecule of the polymeric stabilizer in accordance with the invention, may be further stabilized by the addition of about 0.5% to 1.5% by weight of phenolic stabilizers or UV absorbers (mixed in proportions of between about 1:1 and 4:1). The stabilizing effect is, however, predominantly produced by the functionally active light stabilizing moieties in the polymeric stabilizer of the invention.

It is surprising that the stabilizing properties of the light stabilizing moieties are not affected by their incorporation in a polymeric stabilizer molecule. Even quantities of the light stabilizing moieties below 0.5% by weight, incorporated in the polymeric stabilizer are capable of producing a stabilizing effect in a host polymer such as is unknown from other types of stabilizers. Moreover, the stabilization is resistant to migration and loss during working.

The polymeric light stabilizers of the invention are particularly advantageous when used in shaped products which have a relatively large surface/volume ratio, in particular fibers and filaments, films, foils, and coatings. In these products, the advantages achieved by the present invention manifest their full effect, for example, the resistance to migration and loss, and their stability to boiling, dyeing, washing and chemical dry cleaning. When used for stabilizing fiber materials, it is advantageous that such stabilized fibers do not lose their protection by the stabilizer in the spinning process. By contrast, it has been found that many of the usual stabilizers, such as Ionol or UV-absorbers (for example, Tinuvin 327 or Tinuvin 328 - Ciba-Geigy) are to a large extent lost in the process of dry spinning, in spite of their relatively high molecular weights, due to sublimation with the evaporating solvent.

The molecular weight of these stabilizer moiety-containing polymer molecules of the invention should preferably be between 500 and 100,000. Polymeric stabilizers which have too low a molecular weight are liable to give rise to troublesome migration and evaporation losses during working of the host polymer, or use. Polymeric stabilizers having too high a molecular weight are liable to be incompatible with the host polymer.

The molecular weight limits of the polymeric stabilizers are primarily determined by two factors. One factor is compatibility with the host polymer. The second factor is the molecular weight of the intermediate ester polymer that is used to make the polymeric stabilizer. If the intermediate ester polymer is custom made, it may be prepared to have any desired molecular weight. However, it may also be purchased, in which case its molecular weight is limited by what is available commercially.

Since the intermediate ester polymer can be produced by known means from the desired monomer mixture, generated by simple addition polymerizaiton of the ethylenically unsaturated monomers, there is no need for the development of new polymerization techniques.

For stabilizing polyolefins such as polypropylene, the polymeric stabilizer must have little polarity or it will not be compatible. A highly polar polymeric stabilizer may be useful in a more polar polymer, however.

The polymeric light stabilizing compounds according to the invention are basically suitable for use as additives for stabilizing any of those host polymers which have already been proposed, for example, for stabilizaion by derivatives of tetramethyl piperidine (cf. for example German Auslegeshrift No. 2,349,962 or German Offenlegungsschrift 25 45 646), or for stabilization by substituted 4-piperidinol derivatives (as in U.S. Pat. No. 4,075,165). These patents are incorporated herein by reference.

The term "polymeric" is used herein in a generic sense, to refer to both homopolymers and copolymers.

The above examples are exemplary rather than limiting. The appended claims are intended to encompass all modifications that would readily occur to those of ordinary skill in the art and are not to be limited except as expressly stated therein. For example, while the polymeric mixed ester compounds of the invention are designed for use as light stabilizing additives for polymers, such as polypropylene, they are themselves permanently stabilized polymers. As such they can be cast into shapes or made into films and fibers.

While the invention has been disclosed in this patent application by reference to the details of preferred embodiments of the invention, it is to be understood that his disclosure is intended in an illustrative rather than in a limiting sense, as it is contemplated that modifications will readily occur to those skilled in the art, within the spirit of the invention and the scope of the appended claims.

We claim:

1. An organic composition subject to thermal oxidative or actinic light deterioration, having incorporated therein a stabilizing amount of a piperidine modified acrylate-methacrylate copolymer stabilizer comprisng monomer units (I), (II), (III), and (IV) corresponding to the formula:

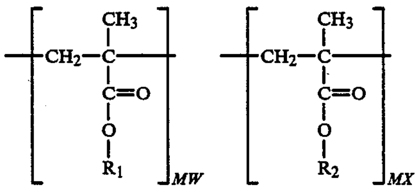

-continued

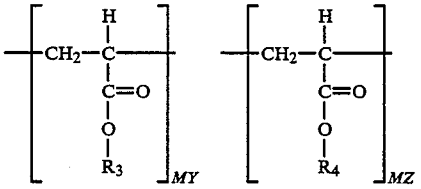

wherein $R_1$ and $R_4$ may be the same or different, and each is a lower alkyl radical; $R_2$ and $R_3$ may be the same or different, and each is a substituted piperidine radical; M is equal to the total number of monomer units in the polymer chain, and is of a magnitude sufficient to provide a polymer having molecular weight of at least 500; W is equal to at least 0.5; X is equal to at least 0.1 but not greater than 0.2, Y is equal to at least 0.1, Z is equal to at least 0.05 but not greater than 0.2, and W plus X plus Y pluz Z is equal to 1.

2. The organic composition according to claim 1 wherein said polymeric stabilizer is present in an amount equal to from about 0.01% to about 5.0% of the total weight of the composition.

3. The organic composition according to claim 1 wherein said polymeric stabilizer is present in an amount equal to from about 0.05% to about 2.0% of the total weight of the composition.

4. The organic composition according to claim 1 wherein said polymeric stabilizer is present in an amount equal to from about 0.1% to about 1.0% of the total weight of the composition.

5. The organic composition according to claim 1 wherein said polymeric stabilizer is present in an amount sufficient to provide from about 0.00035 grams to about 0.3 grams of Nitrogen per 100 grams of said organic composition.

6. The organic composition according to claim 1 wherein said polymeric stabilizer is present in an amount sufficient to provide from about 0.00035 grams to about 0.175 grams of Nitrogen per 100 grams of said organic composition.

7. The organic composition according to claim 3 wherein said organic composition is a polyolefin polymer.

8. The organic composition according to claim 3 wherein said organic composition is a polyolefin copolymer.

9. The organic composition according to claim 3 wherein said organic composition is a polypropylene polymer.

10. The organic composition according to claim 3 wherein said organic composition is a polypropylene copolymer.

11. The organic composition according to claim 3 wherein said organic composition is a vinyl halide polymer.

12. The organic composition according to claim 3 wherein said organic composition is a vinyl halide copolymer.

13. The organic composition according to claim 3 wherein said organic composition is a polyethylene polymer.

14. The organic composition according to claim 3 wherein said organic composition is a polyethylene copolymer.

15. The organic composition according to claim 3 wherein said organic composition is a polystyrene polymer.

16. The organic composition according to claim 3 wherein said organic composition is a polystyrene copolymer.

17. The organic composition according to claim 3 wherein said organic composition is a linear low density polyethylene.

18. The organic composition according to claim 3 wherein said organic composition is an acrylic based coating composition.

19. The organic composition according to claim 3 wherein said organic composition is a polyurethane based coating composition.

20. The organic composition according to claim 3 wherein said organic composition is an alkyd resin based coating composition.

* * * * *

UNITED STATES PATENT AND TRADEMARK OFFICE

CERTIFICATE OF CORRECTION

PATENT NO. : 4,895,901

DATED : January 23, 1990

INVENTOR(S) : Ramey et al.

It is certified that error appears in the above-identified patent and that said Letters Patent is hereby corrected as shown below:

Title page, item [54], line 1, delete "POLYMETIC" and insert --POLYMERIC--.

At column 1, line 1, in the Title, delete "POLYMETIC" and insert --POLYMERIC--.

Signed and Sealed this

Thirtieth Day of March, 1993

Attest:

STEPHEN G. KUNIN

*Attesting Officer* *Acting Commissioner of Patents and Trademarks*